US009590401B2

(12) United States Patent
Landry et al.

(10) Patent No.: US 9,590,401 B2
(45) Date of Patent: Mar. 7, 2017

(54) CABLE RETAINER DEVICE AND METHOD FOR RETAINING CABLE IN AN AIRCRAFT

(75) Inventors: Pierre Landry, Saint-Adèle (CA); Jean-Phillippe Miron, Marieville (CA); Marc-Andre Caudron, Saint-Philippe (CA); Charles Jacques, Dollard-des-Ormeaux (CA); Alexandre Paul, Montreal (CA)

(73) Assignee: BOMBARDIER INC., Dorval, Quebec (CA)

( * ) Notice: Subject to any disclaimer, the term of this patent is extended or adjusted under 35 U.S.C. 154(b) by 0 days.

(21) Appl. No.: 14/374,811

(22) PCT Filed: Feb. 2, 2012

(86) PCT No.: PCT/IB2012/000184
§ 371 (c)(1),
(2), (4) Date: Jul. 25, 2014

(87) PCT Pub. No.: WO2013/114147
PCT Pub. Date: Aug. 8, 2013

(65) Prior Publication Data
US 2015/0214709 A1    Jul. 30, 2015

(51) Int. Cl.
*F16L 3/08* (2006.01)
*H02G 3/32* (2006.01)
*F16L 3/10* (2006.01)

(52) U.S. Cl.
CPC .............. *H02G 3/32* (2013.01); *F16L 3/1058* (2013.01); *Y10T 29/49863* (2015.01)

(58) Field of Classification Search
CPC .... H02G 3/32; F16L 13/1058; F16L 13/1075; F16L 13/1033; F16L 13/10;
(Continued)

(56) References Cited

U.S. PATENT DOCUMENTS

| 4,487,998 A | 12/1984 | Pegram |
| 4,517,408 A | 5/1985 | Pegram |

(Continued)

FOREIGN PATENT DOCUMENTS

| CN | 101454199 A | 6/2009 |
| CN | 101904069 A | 12/2010 |

(Continued)

OTHER PUBLICATIONS

International Search Report and Written Opinion, mailed Nov. 20, 2012, for International Patent Application No. PCT/IB2012/000184.
(Continued)

*Primary Examiner* — Christopher E Garft
(74) *Attorney, Agent, or Firm* — Karceski IP Law, PLLC

(57) ABSTRACT

A retainer device for a cable used in an aircraft includes a base. A moveable member is movably connected to the base and forms a channel with the base that is adapted to receive a cable. A pad-deforming portion is defined in the moveable member, which is displaceable between an open position in which a portion, of the moveable member is separated from the base to provide access to the channel, and closed positions, in which the moveable member is releasably connected to the base. A resilient pad is located in the pad-deforming portion to contact the cable received in the channel. The resilient pad is sized to deform from a rest state to a deformed state by the pad-deforming portion during insertion thereinto. The resilient pad is held captive after insertion into the pad-deforming portion by reforming toward the rest state.

19 Claims, 8 Drawing Sheets

(58) Field of Classification Search
CPC . F16L 55/035; F16L 13/1025; F16L 13/1041;
F16L 13/1083; F16L 13/1215; F16L
55/0335; F16L 27/10; F16L 3/1058; F16L
3/1075; F16L 3/1033; F16L 3/10; F16L
3/1025; F16L 3/1041; F16L 3/1083; F16L
3/1215
USPC .............................. 248/67.5, 67.7, 74.1, 74.2
See application file for complete search history.

(56) References Cited

U.S. PATENT DOCUMENTS

| | | | |
|---|---|---|---|
| 5,240,209 A | 8/1993 | Kutsch | |
| 5,435,506 A * | 7/1995 | Wiley | F16L 3/10 |
| | | | 248/74.1 |
| 5,568,906 A * | 10/1996 | Hahn | F16L 3/13 |
| | | | 248/229.13 |
| 5,612,509 A | 3/1997 | Market | |
| 5,860,681 A * | 1/1999 | Slais | B60H 1/00571 |
| | | | 248/74.1 |
| 6,170,783 B1 | 1/2001 | Bello | |
| 6,210,003 B1 | 4/2001 | Chan | |
| 6,550,233 B2 | 4/2003 | Blase | |
| 6,561,471 B1 | 5/2003 | Hawie | |
| 6,732,982 B1 | 5/2004 | Messinger | |
| 6,802,480 B1 | 10/2004 | Martello | |
| 6,926,237 B2 | 8/2005 | Shereyk et al. | |
| 7,055,783 B2 | 6/2006 | Rosemann et al. | |
| 7,297,874 B2 | 11/2007 | Yasuda et al. | |
| 7,832,693 B2 | 11/2010 | Moerke et al. | |
| 8,020,825 B2 | 9/2011 | Dostaler et al. | |
| 8,827,214 B2 * | 9/2014 | Ogawa | F16L 3/1041 |
| | | | 248/74.1 |
| 2004/0182973 A1 * | 9/2004 | Kawai | F16L 3/1075 |
| | | | 248/71 |
| 2005/0116122 A1 * | 6/2005 | Nakanishi | F16L 3/2235 |
| | | | 248/68.1 |
| 2009/0236486 A1 | 9/2009 | Matsuno et al. | |
| 2010/0243824 A1 * | 9/2010 | Desai | F16L 3/1075 |
| | | | 248/65 |
| 2014/0151514 A1 * | 6/2014 | Asai | B60R 16/0215 |
| | | | 248/74.1 |
| 2014/0299722 A1 * | 10/2014 | Sampson | F16L 3/1058 |
| | | | 248/74.2 |

FOREIGN PATENT DOCUMENTS

| | | |
|---|---|---|
| CN | 102155587 A | 8/2011 |
| DE | 102009034546 A1 | 7/2011 |
| EP | 0656501 A2 | 6/1995 |
| EP | 0933575 A2 | 8/1999 |
| GB | 2477697 A | 8/2011 |
| JP | 2011153663 A | 8/2011 |
| WO | WO 2011093299 A1 | 8/2011 |

OTHER PUBLICATIONS

Chinese Office Action dated Jun. 13, 2016, for Chinese Patent Application No. 201280068700.3.

* cited by examiner

CABLE RETAINER DEVICE AND METHOD FOR RETAINING CABLE IN AN AIRCRAFT

CROSS-REFERENCE TO RELATED APPLICATION

This is a National Stage Entry into the United States Patent and Trademark Office from International PCT Patent Application No. PCT/IB2012/000184, having an international filing date of Feb. 2, 2012, the entire content of which is incorporated herein by reference. The present application is related to International Patent Application No. PCT/IB2011/000512 filed Mar. 11, 2011, the entirety of which is also incorporated herein by reference.

FIELD OF THE APPLICATION

The present application relates to cable retainer devices used to connect cables to structures, for instance in aircraft.

BACKGROUND OF THE ART

Vehicles such as aircraft feature electric cables extending along the aircraft, for the operation of aircraft systems. Bolting/screwing manipulations are often required to fix cables to the structure of the aircraft. Accordingly, the installation of such cables requires a non-negligible amount of manpower. In addition, aircraft structure elements on which such cables are secured might have limited accessibility during manufacturing or maintenance operations of the aircraft. This limited accessibility causes operators who conduct the installation of the cables to work under non-optimal ergonomic condition thereby rendering bolting/screwing manipulations, in some instances, uncomfortable for the operators. Giving the fact that a conventional aircraft might require hundreds of cable fixtures to be installed to complete the systems installation, conducting bolting/screwing manipulations under non-optimal ergonomic condition might increase the amount of time required to complete the installation and, more importantly, might cause health and safety issues for the operators in charge of completing the operation.

U.S. patent application publication no. 2009/0236486 describes a clamp for wire harnesses. The clamp features a pressing tab 23 that may be closed in different positions by the cooperation of its claws 21 and 22 with engagement portion 15 formed in the main unit 10. Therefore, the clamp may be used with different harness sizes, as observed from FIGS. 5 and 6 thereof. However, the pressing tab 23 is made from a relatively rigid material that is applied directly against the wires, and this may cause kinks in the wires. Moreover, the cantilevered end of the holding portion 6 is exposed, whereby accidental contact with the cantilevered end may result in the inadvertent opening of the holding portion 6.

SUMMARY OF THE APPLICATION

It is therefore an aim of the present disclosure to provide a cable retainer device that addresses at least some issues associated with the prior art.

It is therefore a further aim of the present disclosure to provide a method for retaining a cable in an aircraft that addresses at least some issues associated with the prior art.

Therefore, in accordance with a first aspect of the present disclosure, there is provided a retainer device for cable comprising: a base; a moveable member movably connected to the base and forming with the base a channel adapted to receive a cable, a pad-deforming portion defined in the moveable member, the moveable member being displaceable between an open position in which a portion of the moveable member is separated from the base to provide access to the channel, and at least a first closed position in which the moveable member is releasably connected to the base; and a resilient pad located in the pad-deforming portion of the moveable member adapted to contact the cable received in the channel, the resilient pad being sized to deform from a rest state to a deformed state by the pad-deforming portion during insertion thereinto, the resilient pad being held captive after insertion into the pad-deforming portion by reforming toward the rest state.

Further in accordance with the first aspect, the base has a pair of projections defining therebetween a receptacle, the receptacle and the moveable member forming said channel.

Still further in accordance with the first aspect, at least one detent on one of the projections is for latching engagement with a catch of the moveable member in its closed position.

Still further in accordance with the first aspect, two of said detent are provided, with the moveable member being in a first closed position when latched to a first of the detents, and being in a second closed position when latched to a second of the detents, with the resilient pad pressing against the cable in the second closed position only.

Still further in accordance with the first aspect, the moveable member is a finger hinged to the base for latching to the closed position.

Still further in accordance with the first aspect, an aperture is defined at an end of the finger, the aperture sized to receive a tool end to deform the finger out of the closed position with the base.

Still further in accordance with the first aspect, the moveable member has a gap in the finger to define a support, the pad-deforming portion being in the support.

Still further in accordance with the first aspect, the pad-deforming portion is open to the gap, thereby allowing a portion of the resilient pad to extend into the gap.

Still further in accordance with the first aspect, a free end of the support is received in a cavity of the base in the at least one closed position.

Still further in accordance with the first aspect, the resilient pad has a throat portion received in the pad-deforming portion.

Still further in accordance with the first aspect, the resilient pad comprises an arched portion oriented toward the channel and adapted to contact the cable.

In accordance with another aspect of the present disclosure, an aircraft comprises: a structural element; at least one cable; and a retainer device for cable comprising: a base secured to the structural element of the aircraft; a moveable member movably connected to the base and forming with the base a channel receiving the at least one cable, a pad-deforming portion being defined in the moveable member, the moveable member being displaceable between an open position in which a portion of the moveable member is separated from the base to provide access to the channel, and at least a first closed position in which the moveable member is releasably connected to the base; and a resilient pad located in the pad-deforming portion of the moveable member and contacting the cable received in channel, the resilient pad being sized to deform from a rest state to a deformed state by interaction with the pad-deforming portion during insertion thereinto, the resilient pad being held captive after insertion into the pad-deforming portion by tending toward the rest state.

Still further in accordance with the second aspect, the base has a pair of projections defining therebetween a receptacle, the receptacle and the moveable member forming said channel.

Still further in accordance with the second aspect, at least one detent is on one of the projections for latching engagement with a catch of the moveable member in its closed position.

Still further in accordance with the second aspect, two of said detent are provided, with the moveable member being in a first closed position when latched to a first of the detents, and being in a second closed position when latched to a second of the detents, with the resilient pad pressing against the cable in the second closed position only.

Still further in accordance with the second aspect, the moveable member is a finger hinged to the base for latching to the closed position.

Still further in accordance with the second aspect, an aperture is defined at an end of the finger, the aperture sized to receive a tool end to deform the finger out of the closed position with the base.

Still further in accordance with the second aspect, the moveable member has a gap in the finger to define a support, the pad-deforming portion being in the support.

Still further in accordance with the second aspect, the pad-deforming portion is open to the gap, and further wherein a portion of the resilient pad extends into the gap.

Still further in accordance with the second aspect, a free end of the support is received in a cavity of the base in the at least one closed position.

Still further in accordance with the second aspect, the resilient pad has a throat portion received in the pad-deforming portion.

Still further in accordance with the second aspect, the resilient pad comprises an arched portion oriented toward the channel and adapted to contact the cable.

In accordance with a third aspect of the present disclosure, there is provided a method for retaining a cable in an aircraft, comprising: positioning at least one cable in a receptacle of a retainer device secured to the aircraft; closing the retainer device to a first position; axially moving the at least one cable to adjust an axial position thereof relative to the retainer device; and closing the retainer device to a second position to block axial movement of the at least one cable relative to the retainer device.

Further in accordance with the third aspect, a resilient pad is selected as a function of the dimension of the at least one cable; the resilient pad is inserted into the retainer device; and wherein closing the retainer device to a second position comprises pressing the resilient pad against the at least one cable.

Still further in accordance with the third aspect, inserting the resilient pad comprises deforming the resilient pad from a rest state to a deformed state to fit the resilient pad in a bore of the retainer device, and allowing the resilient pad to reform to the rest state to be held captive in the bore.

Still further in accordance with the third aspect, the retainer device is deformed with a tool to open the receptacle from either one of the first and the second closed positions.

Still further in accordance with the third aspect, the retainer device is closed to at least one of the first and the second position comprises solely applying a manual pressure with a finger.

BRIEF DESCRIPTION OF DRAWINGS

For a better understanding of the present invention, as well as other aspects and further features thereof, reference is made to the following description which is to be used in conjunction with the accompanying drawings, where.

Figure 1:
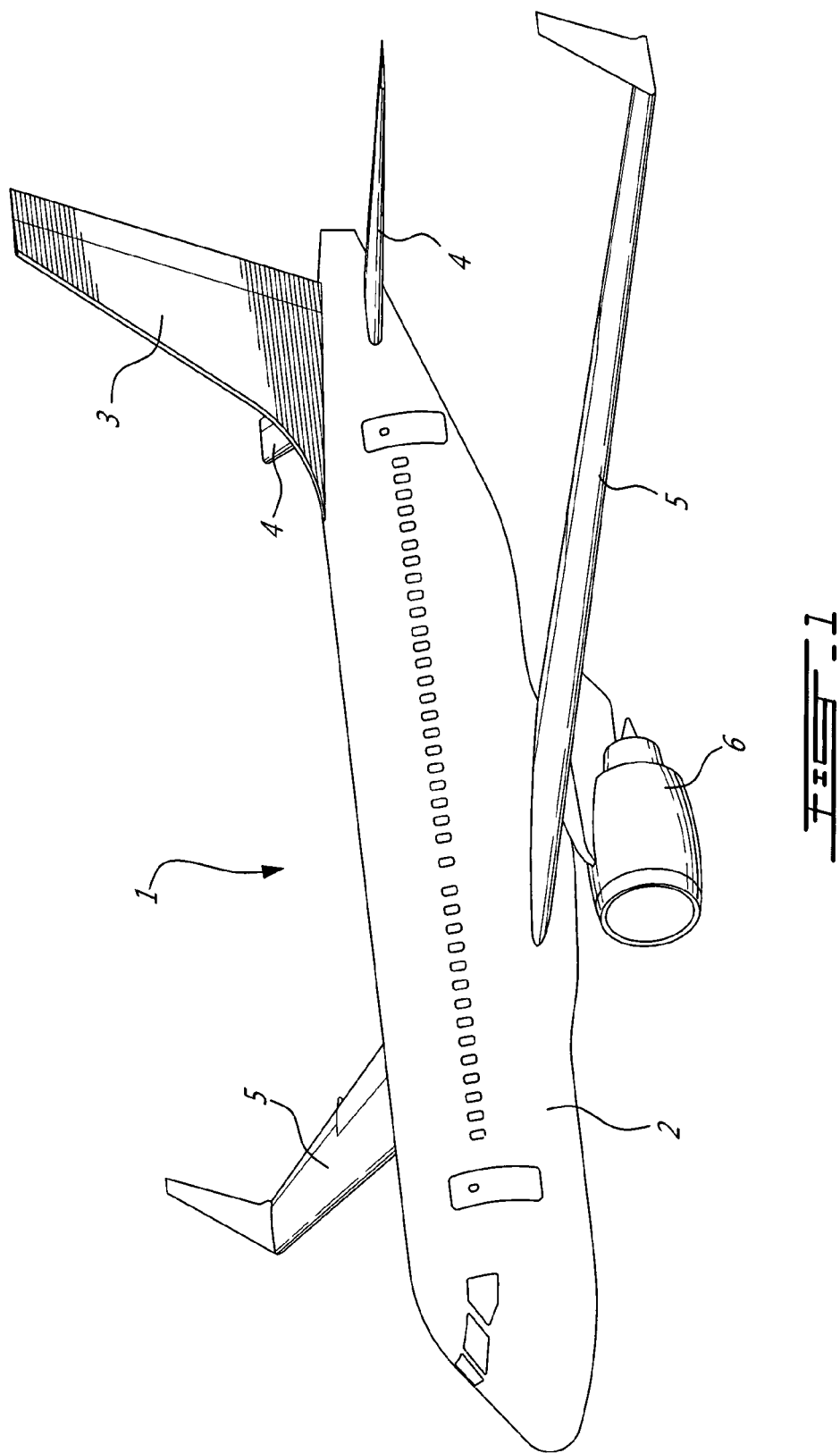
FIG. 1 is a schematic view of an aircraft featuring a cable retainer device of the present disclosure.

In the drawings, embodiments of the invention are illustrated by way of example. It is to be expressly understood that the description and drawings are only for purposes of illustration and as an aid to understanding. They are not intended to be a definition of the limits of the invention.

DESCRIPTION OF PREFERRED EMBODIMENTS

Referring to the drawings, and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

While the cable retainer of the present invention is described in connection with its use in an aircraft, the present disclosure is not intended to be limited solely to aircraft. Other vehicles, structure or construction (e.g. trains, cars, buildings) may also benefit from the approach adopted to retain cables with the cable retainer described herein.

Figure 2:
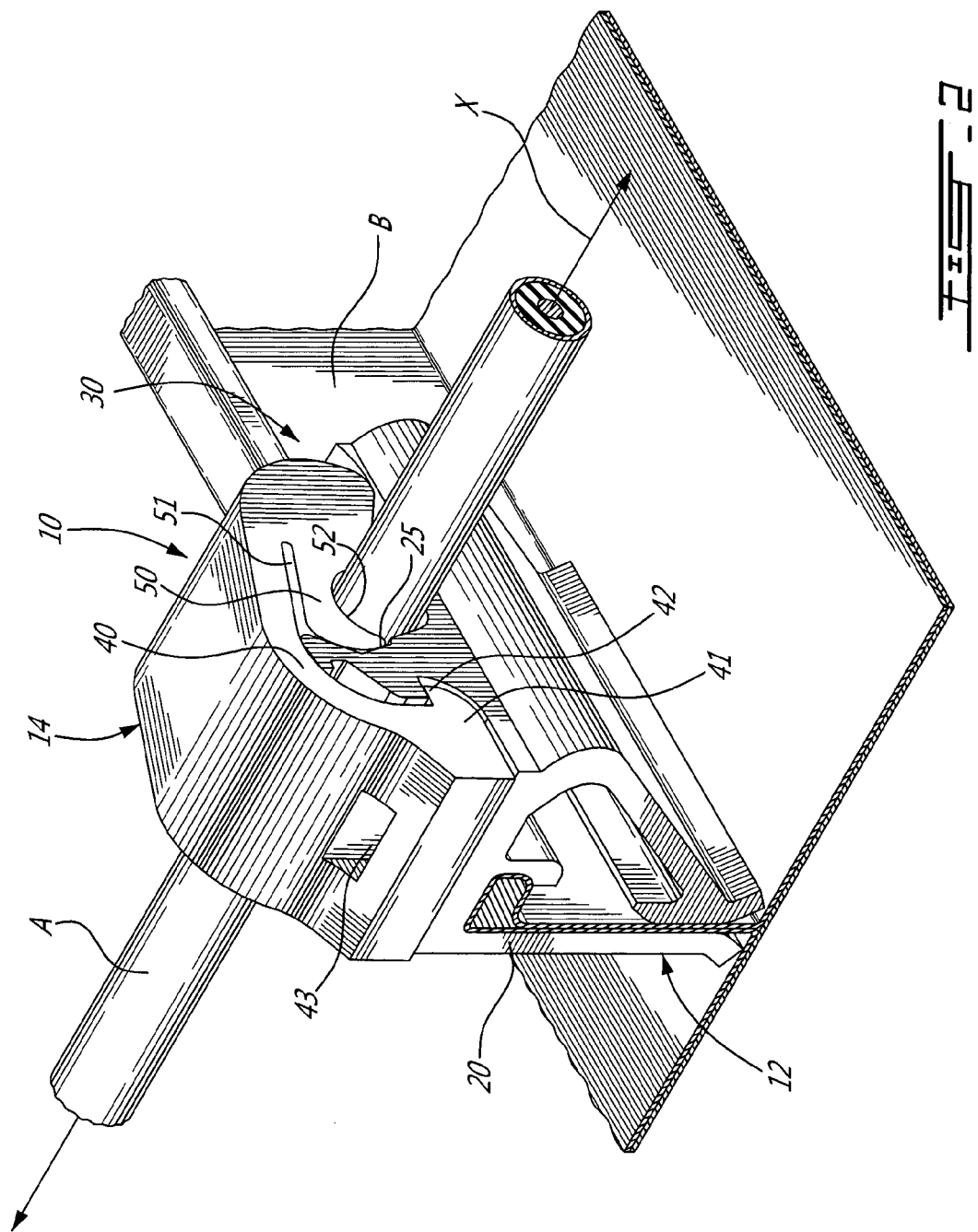
FIG. 2 is a perspective view of the cable retainer device blocking axial movement of a cable.

Referring to FIG. 2, there is shown a perspective view of a cable retainer device 10 as used in the aircraft 1 of FIG. 1, to retain a cable (or cables) and block its movement, in particular its axial movement. Reference is made hereinafter to cables, but the cable retainer device 10 may be used with cables, bundles of cables, harnesses, or the like if sized appropriately. The cable retainer device 10 has a base 12, a moveable member 14, and a resilient pad 16 (FIG. 3).

The base 12 interfaces the cable retainer device 10 to a structure of the aircraft 1. The base 12 may be fixed to the structure. Alternative base designs are also contemplated such as a connector for use with a standoff device from which the cable retained might extend, as described in further detail hereinafter. The connector for standoff device is one possibility among numerous others for the base 12 and other examples of standoff configurations can be found in International Patent Application No. PCT/IB2011/000512.

The moveable member 14 is moveable relative to the base 12 to capture the cable A in the cable retainer device 10, in a closed position.

Figure 3:
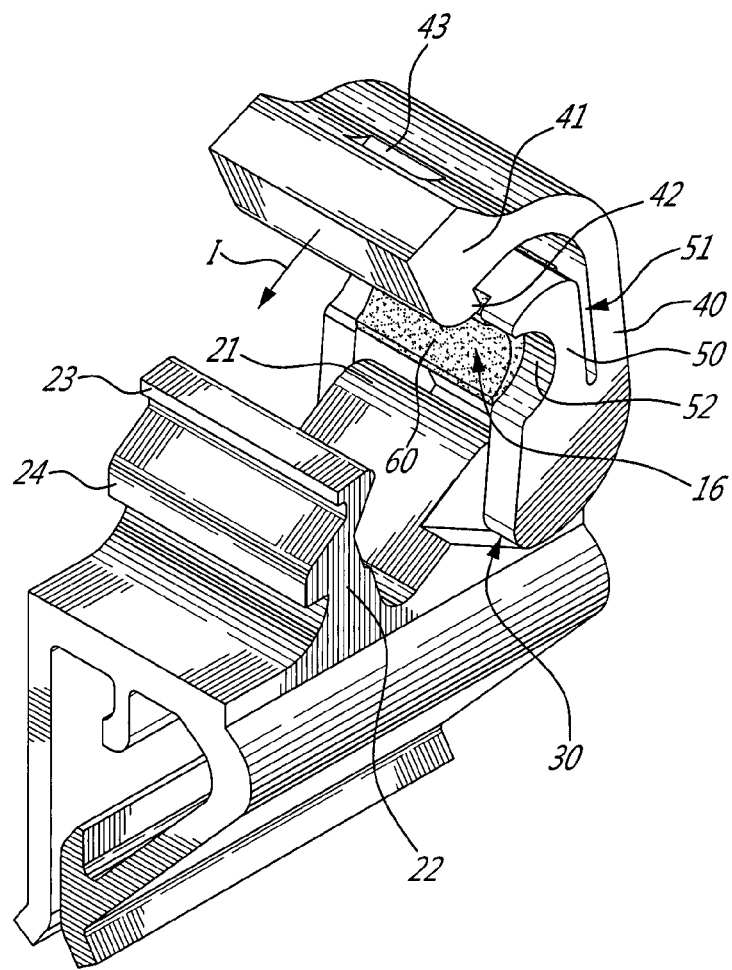
FIG. 3 is a perspective view of the cable retainer device of FIG. 2, in an open position.

The resilient pad 16, shown in FIG. 3, contacts the cable A retained in the cable retainer device 10 to block axial movement of the cable A.

Referring concurrently to FIGS. 2-5, the interrelation between the base 12 and the moveable member 14 is shown in greater detail. The base 12 may have a generally U-shaped bracket 20 by which it may be clipped onto a ridge B of the aircraft structure. In FIG. 3, the ridge B has a bulged edge, whereby the U-shaped bracket 20 may clamp to the ridge B. The U-shaped bracket 20 may be used in combination with other fasteners such as bolts, screws, or the like to further increase the stability of the joint between the base 12 and the ridge B of the aircraft. Moreover, the base 12 may have any other appropriate configurations as alternatives to the U-shaped bracket 20 to be connected to the structure of the aircraft, such as a bracket with a fastener eyelet, by welding, bonding, brazing, etc. The base 12 may thus be connected to the aircraft structure by any appropriate configuration, depending on the shape of the structure to which it will be connected to (e.g., the ridge B, a flat surface, a shoulder, etc.)

Figure 4:
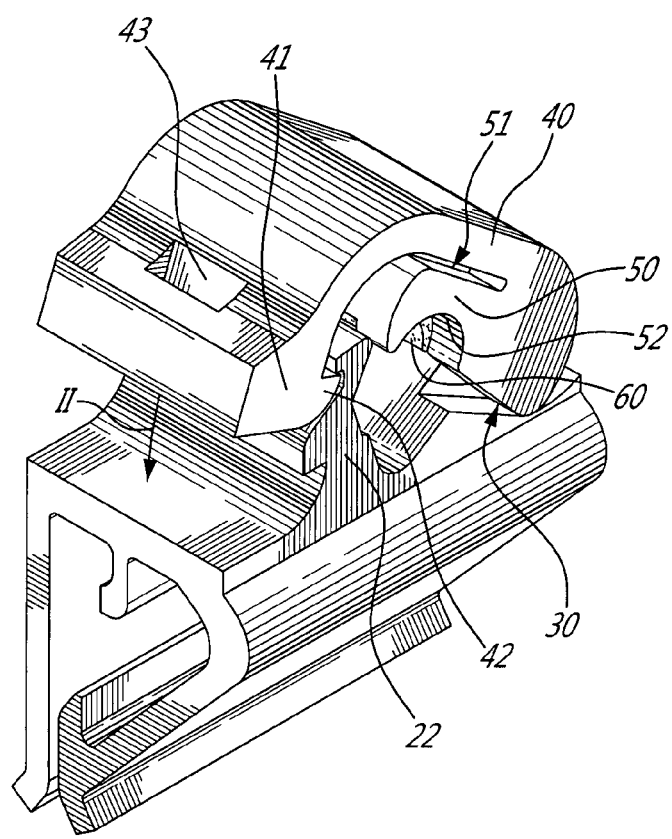
FIG. 4 is a perspective of the cable retainer device of FIG. 2, closed to a first position.
Figure 5:
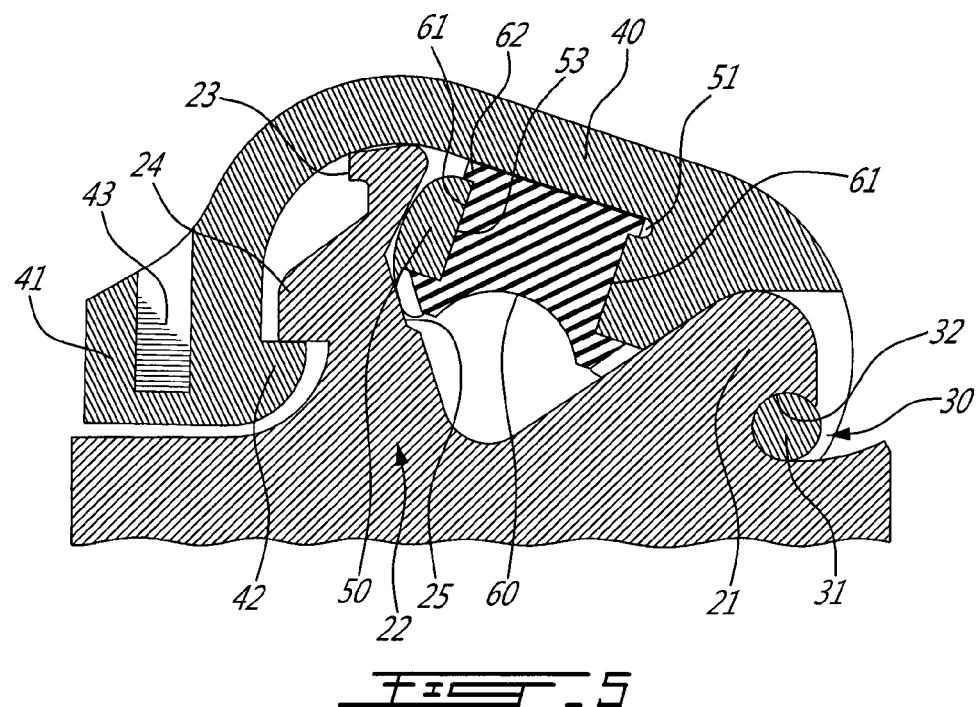
FIG. 5 is a sectional view of the cable retainer device of FIG. 2, closed to a second position, showing a resilient pad in accordance with one embodiment.

The base 12 has a receptacle for receiving the cable A. The receptacle is defined by a valley between a first projection 21 and a second projection 22. As best shown in FIGS. 3-5, the valley between the first projection 21 and the second projection 22 may have a rounded or arcuate shape to match the generally rounded shape of a cable, although other shapes are considered as well. Padding may be provided in the receptacle as a contact interface of the base 12 with the cable A, although not shown in the figures. The padding may, for instance, be glued to the surface of the receptacle, and is typically made of a generally resilient material. The second projection 22 has detents 23 and 24 protruding outwardly from the receptacle. The detents 23 and 24 are provided for the latching of the moveable member 14 to the base 12 in two different closed positions, as described hereinafter. A groove 25 is provided in the receptacle and is defined in the second projection 22.

As best seen in FIGS. 3 and 5, the first projection 21 forms a hinge 30 with moveable member 14. In the illustrated embodiment, the hinge 30 is constituted of a pivot cylinder 31 integral with the moveable member 14 and a cylindrically shaped groove 32 formed in the first projection 21 of the base 12. Other configurations are possible, for instance with the pivot being a part of the base 12 and the groove being a part of the moveable member 14. Moreover, other types of joints are possible as alternatives to the hinge 30 to perform the latching and retaining functions of the cable retainer device 10. For instance, translational or sliding joints are considered as well.

The moveable member 14 has an arm 40 displaceable according to direction I in FIG. 3 relative to the base 12, as a result of the presence of the hinge 30. The arm 40 may therefore move between the open position of FIG. 3 to the closed positions of FIGS. 2, 4 and 5. In the closed positions, the moveable member 14 is retained in captive engagement with either one of the detents 23 and 24 of the base 12, by the presence of a finger 41 having a catch 42 at the end of the arm 40. In FIG. 4, the moveable member 14 is closed to a first position in the base 12 in that the catch 42 is engaged with the detent 23. In FIGS. 2 and 5, the moveable member 14 is closed to a second position relative to the base 12, with the catch 42 being engaged with the detent 24. A channel is therefore formed concurrently by the receptacle of the base 12, and the moveable member 14 in either one of the first closed position of FIG. 4 and the second closed position of FIGS. 2 and 5, with the channel having a smaller diameter in the second closed position.

Referring to FIGS. 1-5, an aperture 43 is defined in a surface of the moveable member 14 facing away from the base 12. The aperture 43 is shown having a rectangular section, with other sectional shapes being possible as well. The aperture 43 is used to receive the working end of the tool to open the cable retainer device 10. Although depicted in FIGS. 1-5, the aperture 43 is not required to perform the opening of the cable retainer.

It is observed that the catch 42 of the moveable member 14 and the detents 23 and 24 concurrently define a latching configuration to allow the movement of the moveable member 14 from the open position of FIG. 3 to, sequentially, the first closed position of FIG. 4, and the second closed position of FIGS. 2 and 5, with a generally low amount of force applied on the moveable member 14. The latching results from an elastic deformation of the base 12 and/or the moveable member 14, with the deformed components substantially regaining their initial shape in the closed positions. For instance, applying a manual force without tools may be sufficient for the moveable member 14 to reach the closed positions.

The latching configuration may required a substantially higher amount of force to move the moveable member 14 back to the open position from either one of the first closed position and the second closed position. By using a tool fitted in the aperture 43 of the moveable member 14, a deformation force may be applied on the finger 41 to cause it to deform out of engagement with either one of the detents 23 and 24. In an embodiment, the rigidity of the material of the moveable member 14 is such that a tool is required to liberate the moveable member 14 from closed engagement with the base 12.

Figure 6:
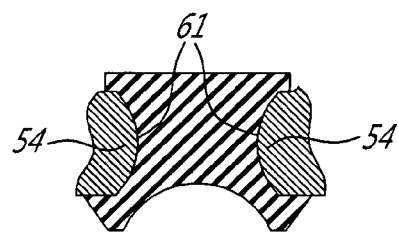
FIG. 6 is an enlarged sectional view of the cable retainer device of FIG. 2, closed to the second position, showing a resilient pad in accordance with another embodiment.

Referring concurrently to FIGS. 2-5, the moveable member 14 further comprises a support 50. According to an embodiment, the support 50 is integral with the arm 40. The support 50 is provided to retain the resilient pad 16 in the cable retainer device 10. In the embodiment, a gap 51 is defined between support 50 and the arm 40. On the side of the support opposite to the gap 51, the support 50 defines an arched portion 52. A throughbore 53 in the support 50 extends from the gap 51 to the arched portion 52. The throughbore will accommodate the resilient pad 16. In an alternative embodiment, the throughbore 53 may instead be a bore, and may be in the arm 40 if there is no support 50 in the moveable member 14. As shown in the embodiments of FIGS. 5 and 6, the resilient pad 16 defines a throat portion to be held captive in the throughbore 53. According to the embodiment of FIG. 6, ribs 54 are defined on opposite sides of the throughbore 53 and cooperate with the resilient pad 16 so that the resilient pad 16 is retained in the moveable member 14.

The resilient pad 16 is therefore in a blocked captive engagement in the moveable member 14: the throughbore 53 has a pad-deforming portion that is of smaller dimension than that of the resilient pad 16. The resilient pad 16 must deform from a rest state to a deformed state to pass through the pad-deforming portion. Once passed beyond the pad-deforming portion of the throughbore 53, the resilient pad 16 resiliently returns or tends to its rest state, resulting in the blocked captive engagement.

The blocked captive engagement provides sufficient strength for the resilient pad 16 to remain connected to the moveable member 14 without the use of adhesives between the resilient pad 16 and the moveable member 14. Although the ribs 54 are illustrated as part of the support 50, it is considered to provide the ribs on the resilient pad 16, with concavities in the support 50 to accommodate the ribs, in an alternative arrangement of the blocked captive engagement.

Referring to FIGS. 5 and 6, the resilient pad 16 is shown having a semicircular portion 60 that is oriented towards the receptacle of the base 12. Hence, the channel defined by the cooperation between the moveable member 14 and the base 12 is quasi cylindrical by the semicircular portion 60 of the resilient pad 16 and the arcuate shape of the valley of the receptacle of the base 12. The throat portion of the resilient pad 16 may be formed by a pair of lateral grooves 61 provided on opposite sides of the resilient pad 16 and are sized to receive the ribs 54 of the moveable member 14. Therefore, when inserted into the throughbore 53 of the moveable member 14, the resilient pad 16 has its throat portion in the throughbore 53 of the support 50, and the portion 62 is lodged in the gap 51. Other configurations are contemplated, for instance without the gap 51. It is also observed that a free end of the support 50 may be lodged in the groove 25 of the second projection 22 when the moveable member 14 is in the second closed position, for instance to prevent movement of the support 50 relative to the base 12. The resilient pad 16 abuts a side of the moveable member 14 so that a normal force resulting from the interaction of the cable with the resilient pad 16 when in the second position is applied to the moveable member 14. It is observed from FIG. 5 that the free end of the moveable member 14 may not protrude beyond the adjacent edge of the base 12. By not having any protruding end, the risk of accidentally opening the moveable member 14 may be reduced.

The base 12 and the moveable member 14 are typically made of a relatively rigid material, such as polymers. Polymers well suited to be used for the base 12 and the moveable member 14 include non-exclusively polyamide, polyaryletherketone, polyetherimide, and ethylene-tetra-fluoroethylene. It may be considered to use other materials such as composites or metal if conditions are appropriate. Moldable polymers offer a cost-effective solution with suitable properties such as electrical insulation, lightness, structural integrity and relatively low thermal conductivity.

The resilient pad 16 is made of a material having a greater level of resilience than the base 12 and moveable member 14. In an embodiment, the material is selected for the resilient pad 16 to remain in an elastic deformation state when being deformed to be placed in the throughbore 53 of the moveable member 14. Moreover, the resilient pad 16 may have a greater resiliency than that of the sheath of the cable A to reduce damaging the cable A if the cable A were to move or apply pressure on the resilient pad 16. Suitable materials include non-exclusively rubbers, polymeric materials such as nitride, EPDM, and other like rubbery materials.

A single one of the retainer device 10 may be used with cables, bundles of cables, or harnesses of different dimensions. According to an embodiment, the same kit of base 12 and moveable member 14 may accommodate resilient pads 16 having different radii for the semicircular portion 60. As it is the semicircular portion 60 that contacts the cable, the resilient pad 16 that will be used for the retainer device 10 may be selected as a function of the diameter of the cable that must be connected to the structure.

According to another embodiment, the cable retainer device 10 may have a pair of the moveable members 14 connected on opposite sides of the base 12, to interconnected cables.

Now that the cable retainer device 10 has been described, a method for retaining a cable is shown at 70 in FIG. 7 and is set forth below.

According to step 71, with the cable retainer device 10 in the open position of FIG. 3, a cable is positioned in the receptacle of the retainer device 10. The cable is, for instance, part of an electrical system of the aircraft 1 of FIG. 1. In step 71, the cable retainer device 10 is preferably already secured to the structure of the aircraft, for instance in the manner shown in FIG. 2. Moreover, the size of the resilient pad 16 must be selected before the installation of the 3o cable therein. The resilient pad 16 is selected as a function of the diameter of the cable, and the resilient pad 16 is manually forced into blocked captive engagement in the moveable member 14, by the deformation of the resilient pad 16 when passing through a pad-deforming portion of the bore 53 in the moveable member 14.

According to step 72, with the cable within the receptacle of the base 12, the retainer device 10 is closed to a first position. For instance, the first position is shown in FIG. 4, for the cable retainer device 10. The channel defined in the first-position closed position of the cable retainer device 10 is such that the cable is held captive in the cable retainer device 10, but axial movement of the cable is possible relative to the cable retainer device 10. Due to the nature of cable installation, the cable may be pulled either way (along direction X in FIG. 2) to provide some loose cable at either end. According to an embodiment, the sole manual pressure applied by a finger may suffice to close the retainer device 10 to the first position.

Figure 7:
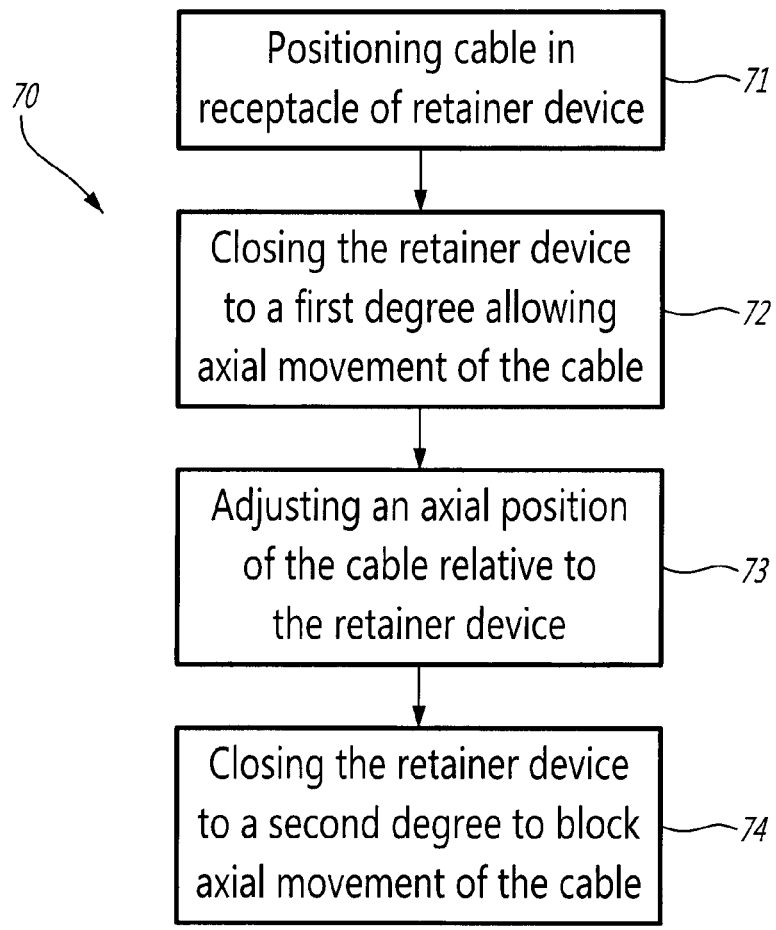
FIG. 7 is a flow chart of a method for blocking axial movement of a cable in an aircraft.

Therefore, according to step 73 of FIG. 7, the axial position of the cable is adjusted relative to the retainer device 10. As shown in FIG. 2, the axial position of the cable is adjusted by moving same along direction X.

According to step 74 of FIG. 7, when a desired axial position has been reached for the cable A, the retainer device 10 may be closed to the second position, from the first closed position, as illustrated by direction II in FIG. 4. Referring to FIG. 2, the cable retainer device 10 is in its second closed position, with the resilient pad 16 applying pressure on the cable A. Therefore, in the second closed position of the moveable member 14, the axial movement of the cable A is blocked. According to an embodiment, the sole manual pressure applied by a finger may suffice to close the retainer device 10 to the second position.

Figure 9:
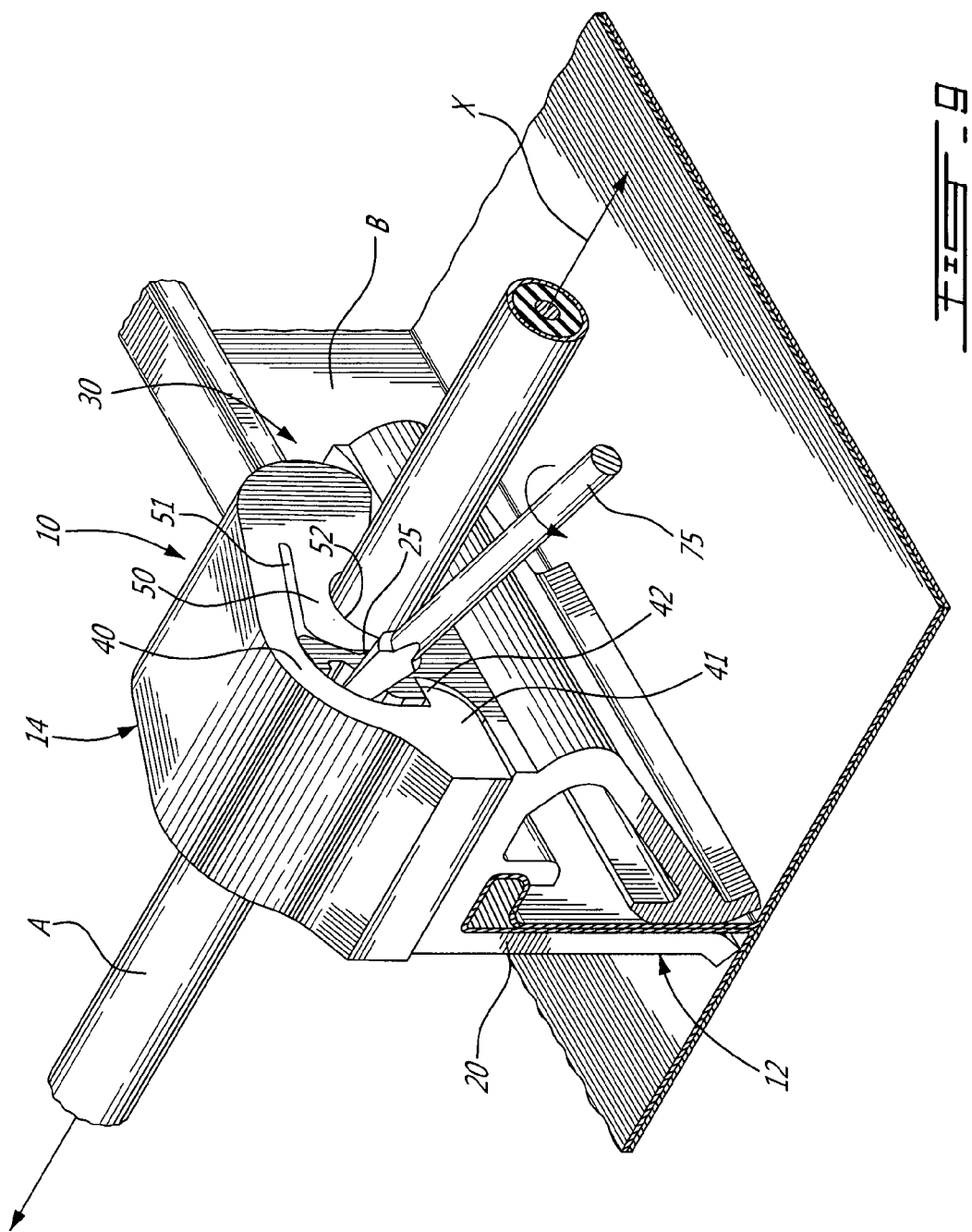
FIG. 9 is a perspective view of the cable retainer device blocking axial movement of a cable, as being opened with a tool.

In order to remove the cable from the cable retainer device 10, a tool is inserted into the aperture 43, and the finger 41 is deformed out of engagement with the base 12. Alternatively, referring to FIG. 9, tool 75 (e.g., flat-bladed screwdriver) may be inserted in any appropriate gap formed between the movable member 14 and the base 12. A manually-induced rotation or a levering motion of the tool 75 will cause deformation of the movable member 14, thereby separating same from engagement with the base 12 in either one of the closed positions.

Figure 8:
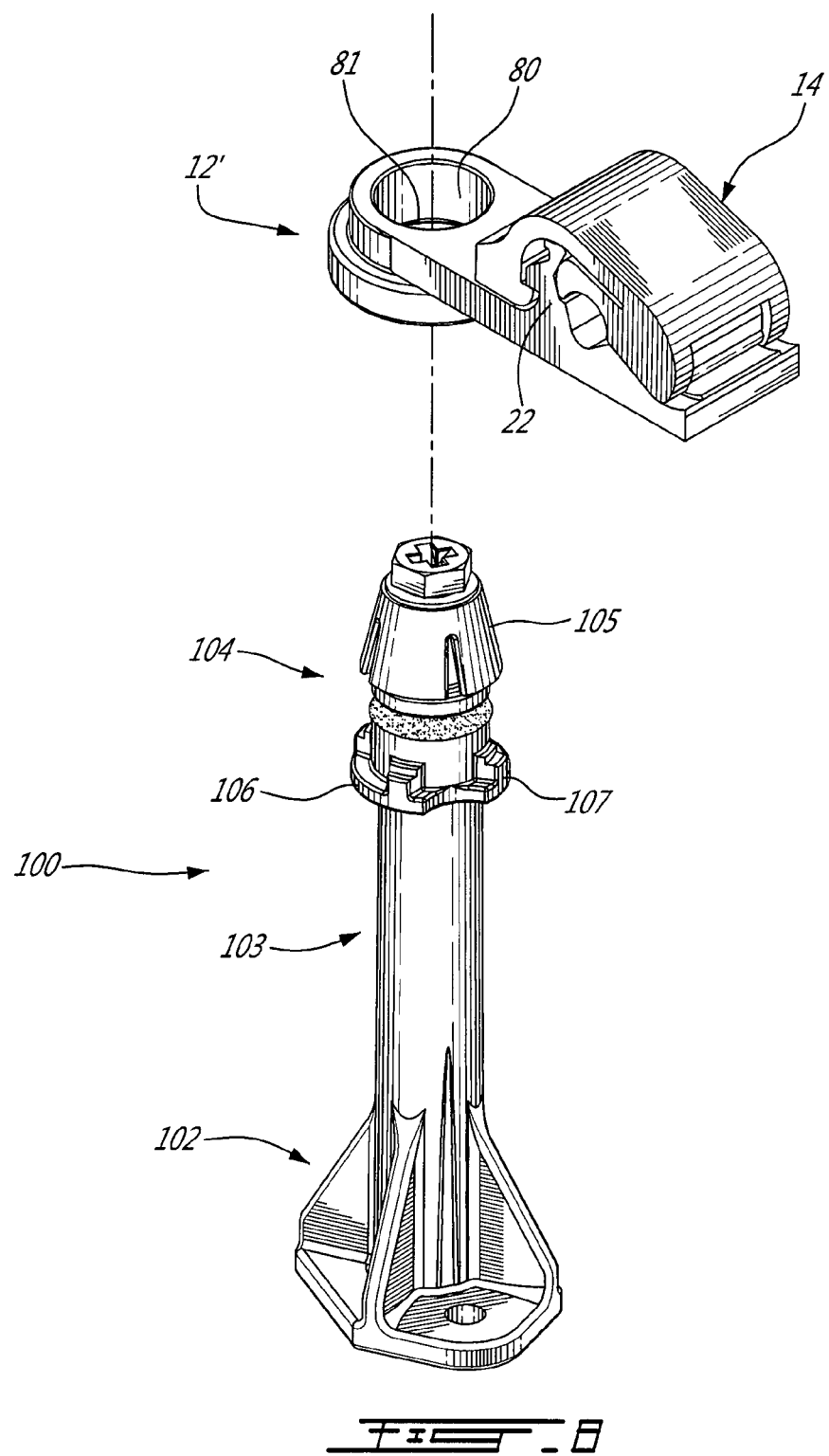
FIG. 8 is a perspective view of the cable retainer device as configured for being used with a standoff device.

Referring to FIG. 8, an alternative embodiment of the base is generally shown at 12'. The base 12' has a throughbore 80 and indexation cavities 81 devised to be used with a standoff device 100.

The standoff device 100 has a fixation portion 102, a spacing portion 103, and a connector portion 104. The base 12' is releasably secured to the connector portion 104 of the device 100. The fixation portion 102 is the interface between the device 100 and a structure. The spacing portion 103 projects from the fixation portion 102 and distances the connector portion 104 from the structure, whereby the retainer device 10 and wires are held at a stand-off distance from the structure.

The connector portion 104 is the interface of the standoff device 100 with the cable retainer device 10. The connector portion 104 is shown having a retaining clip 105, by which the base 12' may be releasably secured to the standoff device 100. The retaining clip 105 has a generally frustoconical body or skirt, and is concentrically secured to a free end of the device 100. The retaining clip 105 is oriented such that the flared geometry is oriented toward the spacing portion 103. The flared end of the retaining clip 105 is constituted of resilient tabs, at the end of which are abutment edges. The resilient tabs are separated by slits. Due to the resilient nature of the tabs and the presence of slits, a pressure applied on the outer surface of the retaining clip 105 will have the resilient tabs move toward one another.

Accordingly, if the base 12' is threaded onto it, the retaining clip 105 will deform so as to allow the component to pass thereover. Once the base 12' is beyond the abutment edges, the retaining clip 105 returns to its flared shape (i.e., reforms), thereby opposing the abutment edges against the base 12', thus preventing the component from moving axially over the retaining clip 105.

Still referring to FIG. 8, the connector portion 104 has a flange 106 just below the retaining clip 105. The flange 106 is located between the abutment edges of the retaining clip 105 and the spacing portion 103. The flange 106 will prevent the axial displacement of the base 12' toward the structure to which the device 100 is connected, while the clip 105 prevents the base 12' from moving out of engagement with the device 100.

Indexation blocks 107 are formed on the flange 106. In the illustrated embodiment, the indexation blocks 107 are equidistantly spaced apart from one another. The indexation blocks 107 will cooperate with corresponding cavities 81 in the base 12' to block the base 12' in rotation about a longitudinal axis of the device 100. However, the orientation of the base 12' may be selected when positioning the base 12' onto the device 100. The indexation cavities 81 are sized so as to accommodate the indexation blocks 107 of the connector portion 104. Accordingly, when the indexation blocks 107 are received in the indexation cavities 81, the base 12' is prevented from rotating about the longitudinal axis of the device 100.

Additional details are provided in International Patent Application No. PCT/IB2011/000512, incorporated herein by reference.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A retainer device for cable comprising:
a base;
a moveable member movably connected to the base and forming with the base a channel adapted to receive a cable, the movable member comprising:
a support integrally formed with an arm of the moveable member, wherein the support comprises a first end fixed to the arm of the movable member, and a second free end,
a gap defined between the support and the arm, and
a pad-deforming portion defined in the support,
the moveable member being displaceable between an open position in which a portion of the moveable member is separated from the base to provide access to the channel, and at least a first closed position in which the moveable member is releasably connected to the base; and
a resilient pad located in the pad-deforming portion adapted to contact the cable received in the channel, the resilient pad being sized to deform from a rest state to a deformed state by interaction with the pad-deforming portion during insertion thereinto, the resilient pad being held captive after insertion into the pad-deforming portion by reforming toward the rest state.

2. The retainer device according to claim 1, wherein the base has a pair of projections defining therebetween a receptacle, the receptacle and the moveable member forming said channel.

3. The retainer device according to claim 2, further comprising at least one detent on one of the projections for latching engagement with a catch of the moveable member in at least the first closed position.

4. The retainer device according to claim 3, comprising two of said detents, with the moveable member being in a first closed position when latched to a first of the detents, and being in a second closed position when latched to a second of the detents, with the resilient pad pressing against the cable in the second closed position.

5. The retainer device according to claim 1, wherein the moveable member is a finger hinged to the base for latching to the closed position.

6. The retainer device according to claim 5, further comprising an aperture at an end of the finger, the aperture sized to receive a tool end to deform the finger out of at least the first closed position with the base.

7. The retainer device according to claim 1, wherein the pad-deforming portion is open to the gap, thereby allowing a portion of the resilient pad to extend into the gap.

8. The retainer device according to claim 1, wherein the second free end of the support is received in a cavity of the base in at least the first closed position.

9. The retainer device according to claim 1, wherein the resilient pad has a throat portion received in the pad-deforming portion.

10. The retainer device according to claim 9, wherein the resilient pad comprises an arched portion oriented toward the channel and adapted to contact the cable.

11. An aircraft comprising:
a structural element;
at least one cable; and
a retainer device for the at least one cable comprising:
a base secured to the structural element of the aircraft;
a moveable member movably connected to the base and forming with the base a channel receiving the at least one cable, the moveable member comprising:
a support integrally formed with an arm of the moveable member, wherein the support comprises a first end fixed to the arm of the movable member, and a second free end, a gap defined between the support and the arm, and a pad-deforming portion defined in the support, the moveable member being displaceable between an open position in which a portion of the moveable member is separated from the base to provide access to the channel, and at least a first closed position in which the moveable member is releasably connected to the base; and a resilient pad located in the pad-deforming portion adapted to contact the at least one cable received in the channel, the resilient pad being sized to deform from a rest state to a deformed state by interaction with the pad-deforming portion during insertion thereinto, the resilient pad being held captive after insertion into the pad-deforming portion by reforming toward the rest state.

12. The aircraft according to claim 11, wherein the base has a pair of projections defining therebetween a receptacle, the receptacle and the moveable member forming said channel, and two detents formed on one of the projections for latching engagement with a catch of the moveable member, wherein the moveable member is in the first closed position when latched to a first of the two detents, and being in a second closed position when latched to a second of the two detents, with the resilient pad pressing against the cable in the second closed position.

13. The aircraft according to claim 11, wherein the moveable member is a finger hinged to the base for latching to the closed position.

14. The aircraft according to claim 13, further comprising an aperture at an end of the finger, the aperture sized to receive a tool end to deform the finger out of at least the first closed position with the base.

15. The aircraft according to claim 11, wherein the pad-deforming portion is open to the gap, thereby allowing a portion of the resilient pad to extend into the gap.

16. The aircraft according to claim 15, wherein a free end of the support is received in a cavity of the base in at least the first closed position.

17. The retainer device according to claim 1, wherein the support defines an arched portion on a side opposite to the gap, the arched portion defining a portion of the channel for receiving the cable.

18. The retainer device according to claim 2, wherein the resilient pad comprises a semicircular portion.

19. A retainer device for cable comprising:

a base;

a moveable member movably connected to the base and forming with the base a channel adapted to receive a cable, the movable member comprising:

a support integrally formed with an arm of the moveable member, the support defining a gap between the support and the arm, wherein the support comprises a first end fixed to the arm of the movable member, and a second free end, and a pad-deforming portion defined in the support, the pad-deforming portion extending through the support and being open to the gap;

the moveable member being displaceable between an open position in which a portion of the moveable member is separated from the base to provide access to the channel, and at least a first closed position in which the moveable member is releasably connected to the base; and a resilient pad located in the pad-deforming portion and extending through the support.

* * * * *